Aug. 24, 1965
W. BURKHART
3,202,040
SUBMARINE POSITIONER SYSTEM
Filed Nov. 8, 1961
2 Sheets-Sheet 1
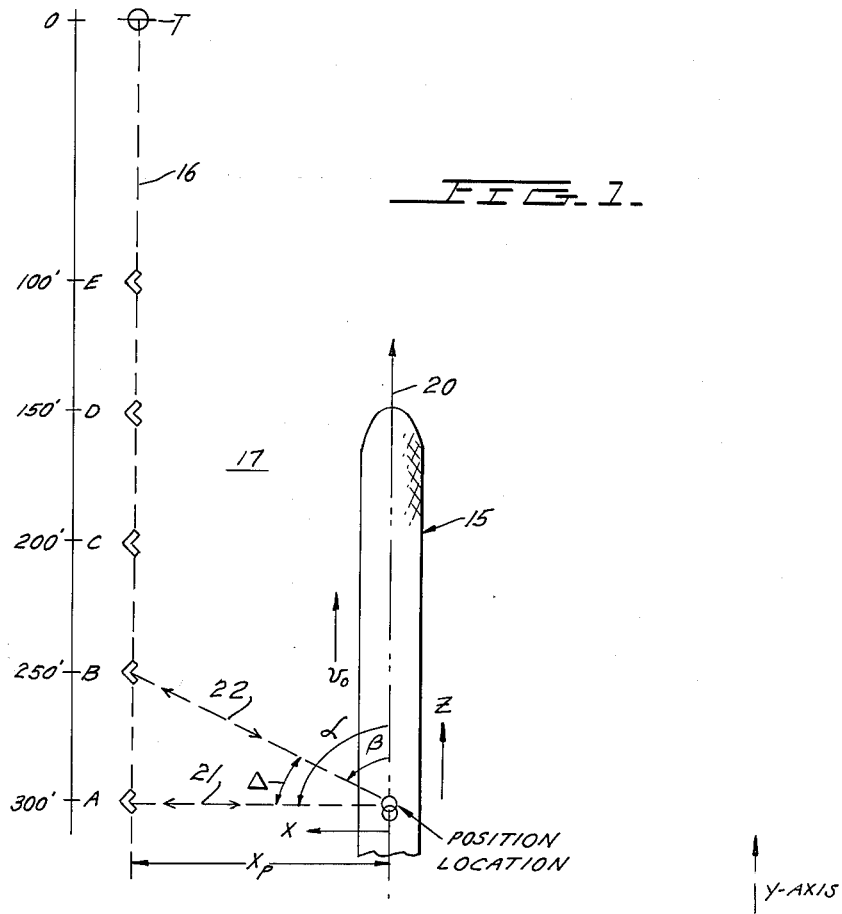
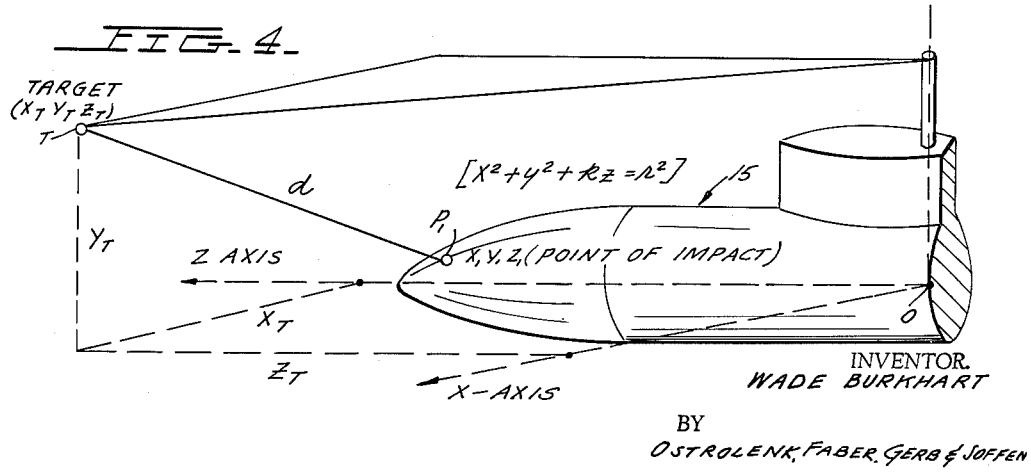
INVENTOR.
WADE BURKHART
BY
OSTROLENK, FABER, GERB & JOFFEN
ATTORNEYS

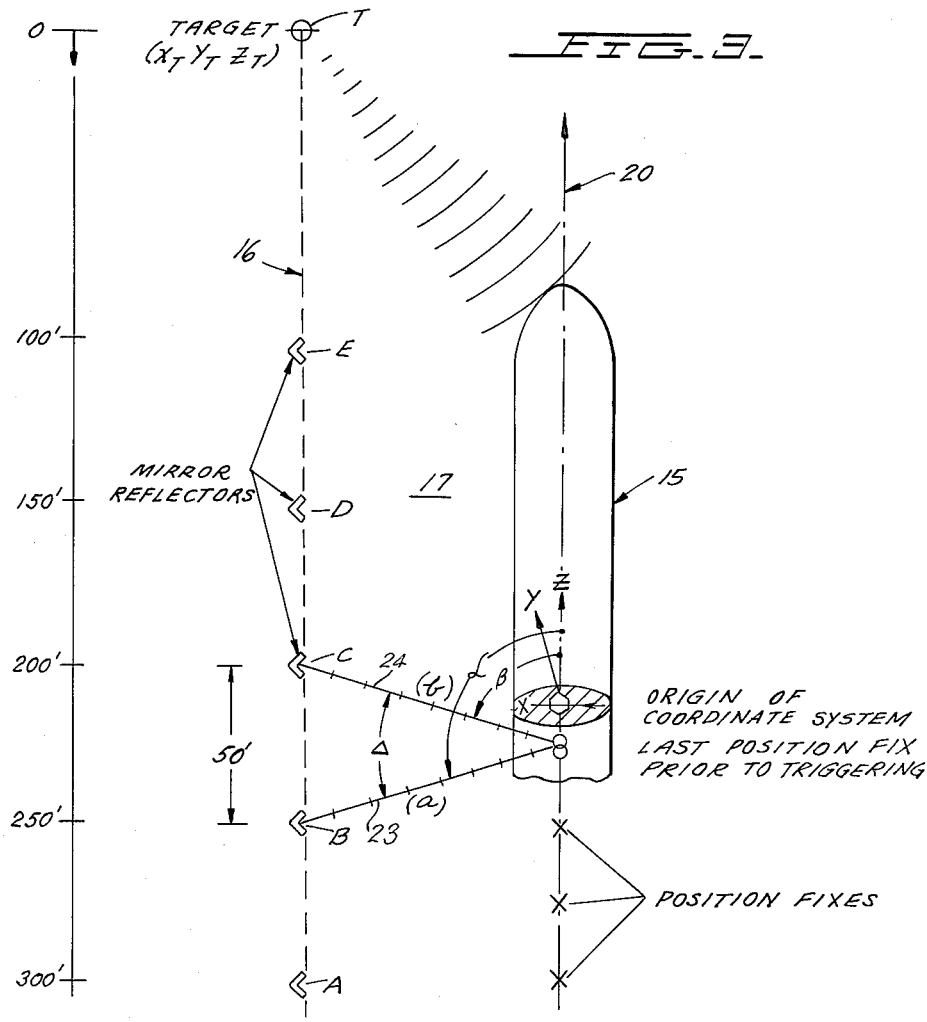
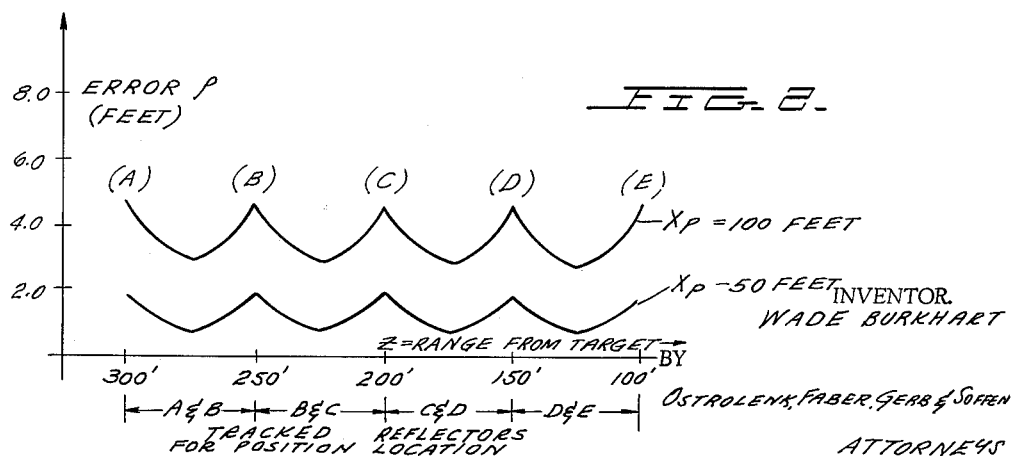

3,202,040
SUBMARINE POSITIONER SYSTEM
Wade Burkhart, New Paltz, N.Y., assignor to Kollsman Instrument Corporation, Elmhurst, N.Y., a corporation of New York
Filed Nov. 8, 1961, Ser. No. 150,938
2 Claims. (Cl. 88—1)

This invention relates generally to submarine positioners, and more particularly relates to a novel system for closely determining the distance from the nearest point on a submarine to a test mine triggered in a test area.

Conventional sonar apparatus is unable to provide such determinations. Passive sonar cannot detect the mine. Active sonar cannot be used on targets closer than a hundred feet because of such considerations as receiver recovery time, reverberation, etc. The present invention uses light transmission through the water from the submarine to special reflectors mounted on a row of specially locater marker buoys.

In accordance with the present invention a line of buoys at preset intervals are arranged at a given height above the test area bottom. A four-corner reflector, or retroreflector, is attached to each buoy. The submarine through a beam generated adjacent its periscope window and returned through its periscope window, utilizes the retroreflector series to accurately fix its position in a three-dimensional manner with respect to the prelocated mine. Simple graphical determinations provide the desired target-to-submarine data, in a manner set forth hereinafter.

The above and further objectives, advantages and details of this invention are described in connection with with an exemplary embodiment thereof, illustrated in the drawings, in which:

FIGURE 1 is a diagrammatic illustration of the triggering submarine on the positioning course for the target mine determinations.

FIGURE 2 is a graph of maximum position errors in the submarine fix determinations with the invention system.

FIGURE 3 is a geometric plot and diagram of the submarine fix determinations.

FIGURE 4 is a graphic illustration of the geometric calculations in utilizing the invention system.

FIGURE 1 diagrammatically shows the relation of the forward section of the submarine 15 navigating at a known velocity $v_0$ along the Z-axis direction of the positioning system. A line 16 of marker buoys are planted in the test or target area 17. The area 17 selected is preferably where the bottom is as smooth and the water as calm as possible. To these buoys are attached suitable retroreflectors A, B . . . E. These buoys and reflectors A, B . . . E are planted at predetermined intervals along the Z-line 16, as 50 feet apart. Their height above the test or target area 17 bottom is also preset, as at 75 to 100 feet.

The reflectors A, B . . . E thus are in a linear (Z) path, at known spacings and height above the area (17) bottom. The first or "zero" buoy has the test mine attached to it, and constitutes the "target," labeled T in FIGURE 1. A surface buoy is coupled to the first or "zero" or target buoy in line 16, to help the navigating submarine 15 locate the line of buoys 16. The target buoy T is used by the submarine to take sufficient fixes to be sure of its orientation before approaching the mine closely. The reflectors are all oriented to the same side for joint operation.

The reflectors A, B . . . E have the specific characteristic of reflecting back an incident beam of light directly in its line. They may be four corner reflectors nested in a known manner to accomplish this action. Another reflector form suitable for this purpose is the retroreflector, such as illustrated in FIGURE 4 of U.S. Patent No. 2,955,209 of October 4, 1960. The reflectors A, B . . . E will be visible regardless of buoy rotation. They will reflect back to the submarine in its target course 20 to enable the successive fixes of its position with respect to the target area 17, target line 16, and target T.

Towards this end, high intensity light sources (not shown) are mounted on the submarine immediately adjacent to the periscope windows in a manner that they rotate in azimuth with the periscopes. This procedure permits the in-line sighting of the individual reflectors A, B . . . E as the submarine navigates the target course 20. In FIGURE 1 the position location is derived from reflectors A and B through beams 21, 22; in FIGURE 3, through beams 23, 24; etc. Accuracies of the order of five feet are readily attained herein.

The following operating procedure is practical for the target-positioning arrangement of FIGURE 1: The submarine dives and, keeping its periscope windows level with the line (16) of marker buoys; follows a course parallel to them, at a known speed, as 1.5 knots. The submarine takes instantaneous position fixes using its two periscopes to measure the angles subtended by the two nearest reflectors. The periscope's altitude will be zero for all readings, as the periscopes are in the same plane as the reflectors A, B . . . E. Their azimuth readings will provide the angles $\alpha$ and $\beta$ as shown in FIGURE 1. The angle $\alpha$ from periscope number one and the angle $\beta$ from periscope number two are read simultaneously at precise 10 second increments to an accuracy of 0.5° or better. Their difference angle is denoted $\Delta$. For other submarine speeds, a suitable time increment is selected.

The submarine's position is plotted on a map of the test area (see FIGURE 3). Angle readout errors of 0.5° cause distance errors $da$ and $db$ which can be found by differentiating the distance equations:

$$\frac{b}{\sin(180-\alpha)} = \frac{50}{\sin \Delta}$$

and $$\frac{a}{\sin \beta} = \frac{50}{\sin \Delta}$$

After differentiations:

$$\frac{db}{50} = \frac{\sin \Delta \cos(180-\alpha)d\alpha - \sin(180-\alpha)\cos \Delta \, d\Delta}{(\sin \Delta)^2}$$

$$\frac{da}{50} = \frac{\sin \Delta \cos \beta d\beta - \sin \beta \cos \Delta d\Delta}{(\sin \Delta)^2}$$

$d\beta = d\alpha = \frac{1}{2}$ degree $= 0.0093$ radian
$d\Delta = (d\alpha)^2 + (d\beta)^2 = 0.707$ deg. $= 0.01315$ radian The maximum position error $\rho$ is equal to:

$$\rho = \sqrt{(da)^2 + (db)^2 - 2da \, db \cos \alpha}$$

with $\alpha = 180 - \Delta$

The maximum error of any one fix is shown by the curves of FIGURE 2 as a function of the $x$ distance normal to the course. Since iterative-position fix plotting will be applied during the entire range run, an error reduction will be obtained by plotting the average course line. The distance $X_p$ is the distance between the parallel courses 16 and 20 (FIGURE 1).

The submarine's position on the course line (20) at the time of explosion is determined by timing the mine's trigger signal in respect to the preceding fix. From this point and using the known periscope height above the centerline of the vessel, the coordinates of the target mine $X_T Y_T Z_T$ in respect to the vessel center point O are established. The distance between the target T and the nearest point P on the submarine 15 is readily computed. FIGURE 4 diagrammatically outlines these parameters and their geometric relationship, for the mathematical determination. The triggering distance $d$ is a three-dimensional XYZ entity, between the target T and the nearest point $P_1$ of impact on the submarine 15 surface. The coordinates $P_1$ are $X_1 Y_1 Z_1$; of the target T, $X_T Y_T Z_T$, with respect to submarine counterpoint O.

The generalized equation of the submarine surface containing the points P of impact is:

(1) $$X^2 + Y^2 + kZ - r^2 = F(XYZ)$$

where:

$k$ is a constant, and $r$ is the sectional radius on the line shown in FIGURE 4 which includes point $X_1$, $Y_1$, $Z_1$ and which is the radius of the nose of the submarine.

Then, by partial differentiation:

(2) $$\frac{\partial F}{\partial x} = 2x$$

(3) $$\frac{\partial F}{\partial Y} = 2Y$$

(4) $$\frac{\partial F}{\partial Z} = k$$

The equations of the normal at point $P_1$ from target T are:

(5) $$\frac{X_T - X_1}{2X_1} = \frac{Y_T - Y_1}{2Y1}$$

and (6) $$\frac{Z_T - Z_1}{k} = \frac{X_T - X_1}{2X_1}$$

The surface equation at P is:

(7) $$X_1^2 + Y_1^2 + kZ_1 - r_1^2 = 0$$

The minimum target distance $d$, between T and $P_1$, with $X_1$, $Y_1$ and $Z_1$ computed from Equations 5, 6 and 7, is:

$$d = \sqrt{(X_T - X_1)^2 + A Y_T - Y_1)^2 + (Z_T - Z_1)^2}$$

These Equations 1 through 8, therefore solve the location of nearest impact point $P_1$ ($X_1 Y_1 Z_1$) and the triggering distance $d$ in the geometric coordinate system, resultant from the invention hereof. Specific details, and variations of the invention will now be understood by those skilled in the art, falling within the broader spirit and scope of the invention as defined in the appended claims.

The embodiments of the invention in which an exclusive privilege or property is claimed are defined as follows:

1. A submarine positioning system in relation to a triggered mine target comprising a series of buoys spaced along a predetermined substantially linear path inclusive of the target position, said buoys being planted along equally spaced positions and at a preset height above the target area bottom to constitute a known reference target path inclusive of the mine, a submerged reflector secured to each of said buoys and oriented to reflect incident light beams from a submerged submarine along a course on one side of the target path, said reflectors being identical to one another and being of the retro-reflector type capable of reflecting an incident beam from the submarine directly back thereto over a relatively wide range of angular incidence of the beam on the reflectors, whereby accurate position fixes are provided for the navigating submarine relative to the target mine along a course of known distance from and parallel to the said target path through simultaneous beam sightings on two adjacent reflectors.

2. A submarine positioning system as claimed in claim 1, in which said preset buoy height is of the order of 75 to 100 feet.

References Cited by the Examiner

UNITED STATES PATENTS 1,149,122  8/15  Fuller _____ 88—85
1,384,014  7/21  Fessenden _____ 340—3
2,432,984  12/47  Budenbom _____ 88—85

OTHER REFERENCES

Dulberger: Will The Laser Succeed Sonar For Undersea Electronics; Electronics, vol. 34, June 9, 1961, pages 24 and 25.

JEWELL H. PEDERSEN, *Primary Examiner.*

EMIL G. ANDERSON, *Examiner.*